(12) United States Patent
Zhou et al.

(10) Patent No.: US 8,819,017 B2
(45) Date of Patent: Aug. 26, 2014

(54) AFFINITIZING DATASETS BASED ON EFFICIENT QUERY PROCESSING

(75) Inventors: Jingren Zhou, Bellevue, WA (US); Patrick James Helland, Seattle, WA (US); Jonathan Forbes, Bellevue, WA (US); Yaron Burd, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 12/905,464

(22) Filed: Oct. 15, 2010

(65) Prior Publication Data

US 2012/0096001 A1   Apr. 19, 2012

(51) Int. Cl.
*G06F 7/00* (2006.01)
*G06F 17/30* (2006.01)

(52) U.S. Cl.
USPC .......................................... 707/737; 707/736

(58) Field of Classification Search
CPC .............. G06F 17/30536; G06F 17/30; G06F 17/30442; G06F 17/30404; G06F 17/30569; G06F 17/30038; G06F 17/30159; G06F 17/30315; G06F 17/30463; G06F 17/30469; G06F 17/30471; G06F 17/30489; G06F 17/30749; G06F 17/30864; G06F 17/3087
USPC ........................................................ 707/737
See application file for complete search history.

(56) References Cited

U.S. PATENT DOCUMENTS

| | | | |
|---|---|---|---|
| 5,675,710 A | 10/1997 | Lewis | |
| 7,272,583 B2 * | 9/2007 | Bradski | 706/12 |
| 7,574,424 B2 | 8/2009 | Chowdhuri | |
| 8,549,022 B1 * | 10/2013 | Kaminski, Jr. | 707/758 |
| 2003/0093411 A1 | 5/2003 | Minor | |
| 2007/0008191 A1 * | 1/2007 | Archbold et al. | 341/50 |
| 2007/0038658 A1 * | 2/2007 | Ghosh | 707/101 |
| 2007/0226624 A1 * | 9/2007 | Peker et al. | 715/719 |
| 2007/0276853 A1 * | 11/2007 | Hamza | 707/101 |
| 2009/0070337 A1 | 3/2009 | Romem | |
| 2009/0109095 A1 * | 4/2009 | Hido et al. | 342/417 |
| 2009/0132213 A1 | 5/2009 | Zhao | |
| 2009/0328054 A1 * | 12/2009 | Paramasivam et al. | 718/105 |
| 2010/0088352 A1 * | 4/2010 | Hendrickson et al. | 707/808 |
| 2010/0286972 A1 * | 11/2010 | Callegari | 703/10 |
| 2011/0154359 A1 * | 6/2011 | Toub et al. | 718/106 |
| 2011/0276579 A1 * | 11/2011 | Colrain et al. | 707/756 |

OTHER PUBLICATIONS

Optimizing Data Aggregation for Cluster-based Internet Services—Published Date: 2002 http://www.cs.ucsb.edu/research/tech_reports/reports/2002-34.pdf.

(Continued)

*Primary Examiner* — Etienne Leroux
*Assistant Examiner* — Jared Bibbee
(74) *Attorney, Agent, or Firm* — Dave Ream; Peter Taylor; Micky Minhas

(57) ABSTRACT

Embodiments of the present invention relate to systems, methods, and computer-storage media for affinitizing datasets based on efficient query processing. In one embodiment, a plurality of datasets within a data stream is received. The data stream is partitioned based on efficient query processing. Once the data stream is partitioned, an affinity identifier is assigned to datasets based on the partitioning of the dataset. Further, when datasets are broken into extents, the affinity identifier of the parent dataset is retained in the resulting extent. The affinity identifier of each extent is then referenced to preferentially store extents having common affinity identifiers within close proximity of one other across a data center.

17 Claims, 8 Drawing Sheets

(56) References Cited

OTHER PUBLICATIONS

Peer Clustering and Firework Query Model in the Peer-to-Peer Network—Published Date: 2003 http://citeseerx.ist.psu.edu/viewdoc/download?doi=10.1.1.18.2696&rep=rep1&type=pdf.
A Hypergraph-Based Workload Partitioning Strategy for Parallel Data Aggregation—Published Date: 2003 http://bmi.osu.edu/resources/publications/13.pdf.
SCOPE:Easy and Efficient Parallel Processing of Massive Data Sets. http://research.microsoft.com/en-us/um/people/jrzhou/pub/Scope.pdf.
Bigtable: a Distributed Storage System for Structured Data. http://static.googleusercontent.com/external_content/untrusted_dlcp/labs.google.com/en/us/papers/bigtable-osdi06.pdf.
MapReduce: Simplified Data Processing on Large Clusters. http://static.googleusercontent.com/external_content/untrusted_dlcp/research.google.com/en/us/archive/mapreduce-osdiO4.pdf.
MapReduce: a Flexible Data Processing Tool. http://cacm.acm.org/magazines/2010/1/55744-mapreduce-a-flexible-data-processing-tool/fulltext.
The Google File System. http://static.googleusercontent.com/external_content/untrusted_dlcp/research.google.com/en/us/archive/gfs-sosp2003.pdf.
Greenplum: a Unified Engine for RDBMS and MapReduce http://www.greenplum.com/resources/mapreduce/.
Hadoop. http://hadoop.apache.org/.
Hadoop's Hive. http://hadoop.apache.org/hive/.
Data on the Outside versus Data on the Inside. http://www.cidrdb.org/cidr2005/papers/P12.pdf.
Dryad: Distributed Data-Parallel Programs from Sequential Building Blocks. http://research.microsoft.com/pubs/63785/eurosys07.pdf.
A Comparison of Approaches to Large-Scale Data Analysis. http://database.cs.brown.edu/sigmod09/benchmarks-sigmod09.pdf.
Leslie Lamport. Paxos Made Simple. http://research.microsoft.com/en-us/um/people/lamport/pubs/paxos-simple.pdf.
Pig Latin: A Not-So-Foreign Language for Data Processing http://www.cs.cmu.edu/~olston/publications/sigmod08.pdf.
Interpreting the data: Parallel analysis with Sawzall. http://static.googleusercontent.com/external_content/untrusted_dlcp/labs.google.com/en/us/papers/sawzall-sciprog.pdf.
MapReduce and Parallel DBMSs: Friends or Foes? http://cacm.acm.org/magazines/2010/1/55743-mapreduce-and-parallel-dbmss-friends-or-foes/fulltext.
DryadLINQ: A System for General-Purpose Distributed Data-Parallel Computing Using a High-Level Language. http://research.microsoft.com/en-us/projects/dryadlinq/dryadlinq.pdf.
Incorporating Partitioning and Parallel Plans into the SCOPE Optimizer.http://research.microsoft.com/en-us/um/people/jrzhou/pub/PGS.pdf.

* cited by examiner

AFFINITIZING DATASETS BASED ON EFFICIENT QUERY PROCESSING

BACKGROUND

Query processing typically requires that a group of datasets be processed together. However, when the group of datasets is stored, datasets are broken into extents that are randomly placed across a data center to allow for even load distribution across the data center. Accordingly, storing extents of datasets randomly across the data center fails to account for inefficiencies that result from randomized storage structures.

SUMMARY

This Summary is provided to introduce a selection of concepts in a simplified form that are further described below in the Detailed Description. This Summary is not intended to identify essential features of the claimed subject matter, nor is it intended to be used as an aid in isolation to determine the scope of the claimed subject matter. Embodiments of the present invention provide methods for affinitizing datasets based on efficient query processing. In particular, methods are provided for assigning affinity identifiers to datasets that are related in query processing. The related datasets are transparently broken into extents by a distribution component at a data center. Additionally, the extents of related datasets are preferentially distributed based on their shared affinity identifier to be within close proximity to other extents with the same affinity identifier.

Data is generally stored in data centers based on an equal distribution algorithm in order to prevent data skew. By distributing data throughout a data center, general data traffic is also spread across the data center, thereby minimizing data traffic jams. However, the way in which data is distributed across data centers does not account for affinitization of data. Accordingly, data that is processed together is not stored together. By storing data within close proximity of other related data, responses to queries may be sped up while overall traffic across the data center may be decreased. As described above, assigning identifiers to related datasets may be used to affinitize the related datasets and, additionally, the extents of the related datasets. As such, affinitized extents of related datasets may be distributed within close proximity when storage space that is close to related extents is available.

BRIEF DESCRIPTION OF THE DRAWINGS

Illustrative embodiments of the present invention are described in detail below with reference to the attached drawing figures, wherein.

DETAILED DESCRIPTION

Figure 1:
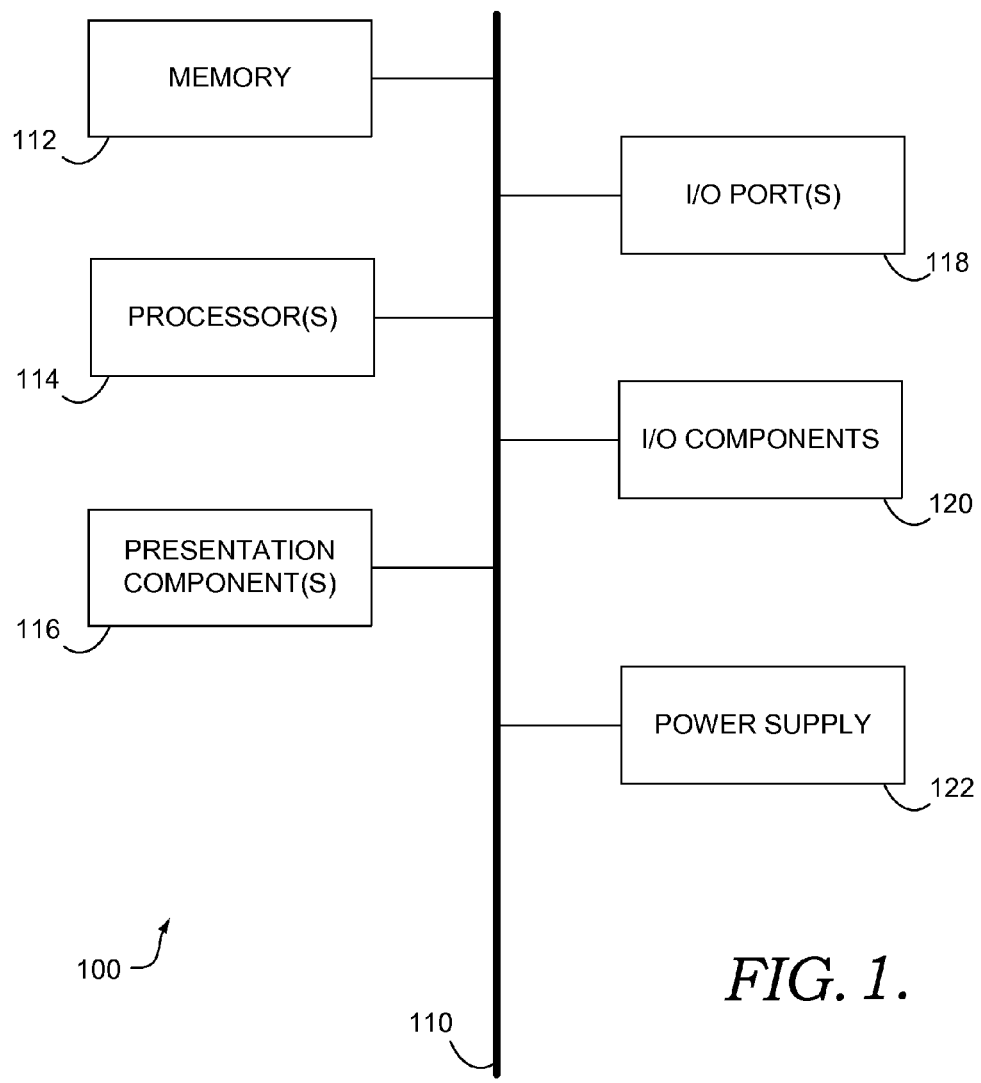
FIG. 1 is a block diagram illustrating an exemplary computing device suitable for use in connection with embodiments of the present invention.

The subject matter of embodiments of the present invention is described with specificity herein to meet statutory requirements. Although the terms "step," "block" and/or "module" etc. might be used herein to connote different components of methods or systems employed, the terms should not be interpreted as implying any particular order among or between various steps herein disclosed unless and except when the order of individual steps is explicitly described.

Embodiments of the present invention provide methods for affinitizing datasets based on efficient query processing. In particular, methods are provided for assigning identifiers to datasets that are related to each other. The assigned identifiers are then used to preferentially distribute extents of datasets within close proximity of each other across a data center. In embodiments, datasets are received at a processing component that compiles datasets into a data stream. The processing component may be within a source library or other source of data. At the point of compilation, the data stream may be partitioned based on relationships between datasets within the data stream. For example, hash partitioning, range partitioning, and random partitioning may be used to partition the data stream. Alternatively, the data stream may be partitioned at runtime by associating the data stream with a second data stream that has already been partitioned. In this alternative, the data stream may reference the partitioning of the second data stream.

Further, each partition may be assigned an affinity identifier, such as an Affinity-GUID. As the data stream is processed to be stored in the data center, extents are created within each partition of the data stream. Accordingly, each extent created is assigned the same affinity identifier associated with its partition. Extents having the same affinity identifier are described as belonging to the same affinity group. Alternatively, an affinity identifier may be assigned to datasets within a data stream prior to the formation of extents. For example, the datasets may be assigned an affinity identifier based on the partition of the datasets. Further, the datasets may be transparently broken into extents with each extent retaining the affinity identifier of its parent database.

Additionally, extents that arise from other data streams may share a common affinity identifier with extents from other data streams. For instance, if datasets associated with a periodical are stored together, updated datasets may be stored within proximity of related, but less recent, datasets of previous issues. Datasets associated with an updated periodical may also be assigned an unique affinity identifier that may be associated, but distinct from, an affinity identifier assigned to datasets associated with an earlier issue of the periodical.

Extents with a shared or associated affinity group may be preferentially stored to be within a given proximity to extents of the same affinity group. In particular, extents may be placed in as close proximity as is available to other extents that share a common or associated affinity group. As discussed further below, there are different levels of proximity. For example, while storing extents on a shared computer is the closest proximity between extents, storing extents within the same computer cluster ("POD") of 20-40 computers is nearly as close in proximity. However, the placement of extents is ultimately based on availability within a data center. As such, there may not be space available on a layer that stores affinitized extents when a further affinitized extent is ready to be stored. Accordingly, affinitized extents of the same affinity group may be stored on different layers, and thus stored at relatively far proximity from other affinitized extents of the same affinity group that are stored together within a common POD. However, an affinitized extent of the same affinity group that is stored on a different layer may still satisfy the condition of being placed as close as possible to other affinitized extents of the same affinity group based on the space available.

Once affinitized extents are preferentially assigned in close proximity to each other, the affinitized extents may be processed efficiently in response to queries received from a user. In particular, once a query request is received from a computing device of a user, a job manager may index processing of the query to efficiently retrieve extents of datasets used to respond to the query.

Accordingly, in one embodiment, the present invention provides one or more computer-storage media having computer-executable instructions embodied thereon that, when executed, perform a method of affinitizing datasets based on efficient query processing. The method comprises receiving a plurality of datasets. The method also comprises determining a first dataset and a second dataset of the plurality of datasets are related to one another. Additionally, a common affinity identifier is assigned to the first dataset and the second dataset based on determining the first dataset and the second dataset are related to one another. The method also comprises breaking the first dataset and the second dataset into a plurality of extents. Each extent of the plurality of extents has the common affinity identifier. Further, the method comprises storing a portion of the plurality of extents across a plurality of distributed computing devices, wherein extents having the common affinity identifier are preferentially stored on computing devices that are in proximity to one another.

In another embodiment, the present invention provides one or more computer-storage media having computer-executable instructions embodied thereon that, when executed, perform a method of affinitizing datasets based on efficient query processing. The method comprises receiving a plurality of datasets within a data stream. The method also comprises partitioning the data stream. Additionally, a determination is made that a first dataset and a second dataset of the plurality of datasets are related to one another based on partitioning the data stream. Further, a first affinity identifier is assigned to the first dataset and a second affinity identifier is assigned to the second dataset. The first and second affinity identifiers are assigned based on determining the first dataset and the second dataset are related to one another. The method also comprises breaking the first dataset and the second dataset into a plurality of extents, each extent of the plurality of extents having an affinity identifier of the dataset from which it originated. Additionally, the method comprises storing a portion of the plurality of extents across a plurality of distributed computing devices. Extents that share an affinity identifier are preferentially stored on computing devices that are in close proximity to one another.

A third embodiment of the present invention provides one or more computer-storage media having computer-executable instructions embodied thereon that, when executed, perform a method of affinitizing datasets based on efficient query processing. The method comprises receiving a first plurality of datasets within a first data stream and receiving a second plurality of datasets within a second data stream. The method also comprises partitioning the first data stream. Additionally, the method comprises partitioning the second data stream to match the partitioning of the first data stream. Further, the method comprises determining a first dataset of the first plurality of datasets and a second dataset of the second plurality of datasets are related to one another based on the partitioning of the first data stream matching the partitioning of the second data stream. A common affinity identifier is assigned to the first dataset and the second dataset based on determining the first dataset and the second dataset are related to one another. The method also comprises breaking the first dataset and the second dataset into a plurality of extents. Each extent has the common affinity identifier of the dataset from which it originated. Further, the method comprises storing a portion of the plurality of extents across a plurality of distributed computing devices at a data center. Extents having the common affinity identifier are preferentially stored on computing devices that are in close proximity to one another.

Various aspects of embodiments of the invention may be described in the general context of computer program products that include computer code or machine-useable instructions, including computer-executable instructions such as applications and program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Additionally, computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-executable instructions 113 stored in volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/O components 120. In an embodiment, the one or more processors 114 execute the computer-executable instructions 113 to perform various tasks and methods defined by the computer-executable instructions 115. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse. I/O components 120 can also include communication connections 121 that can facilitate communicatively connecting the computing device 100 to remote devices such as, for example, other computing devices, servers, routers, and the like.

Figure 2:
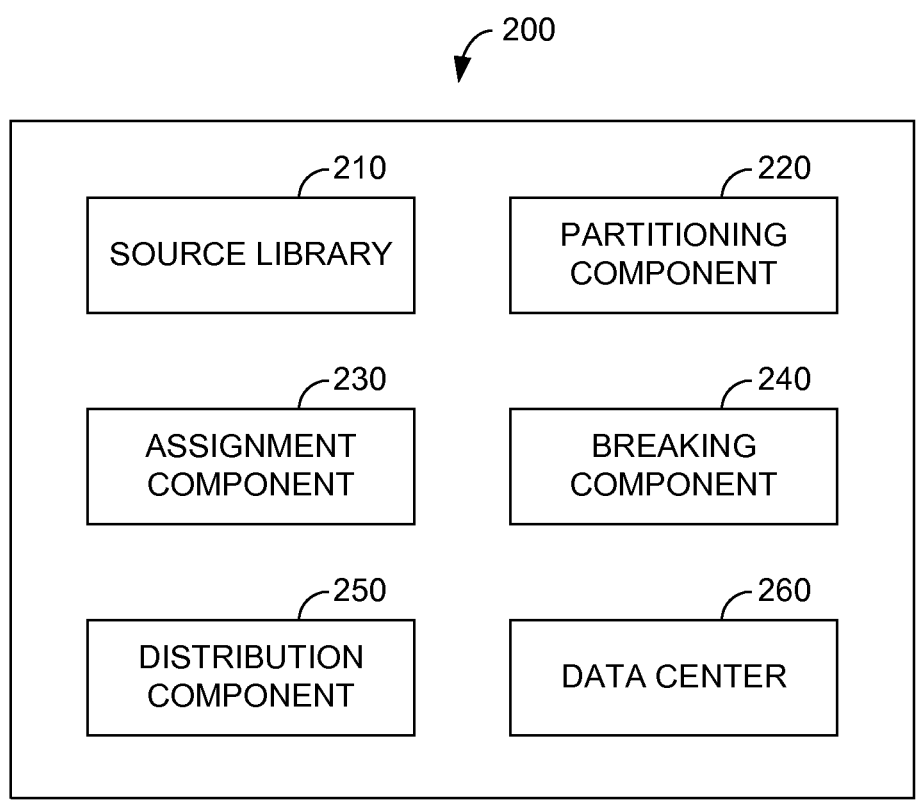
FIG. 2 is a schematic diagram illustrating an exemplary system for affinitizing related dataset extents across a data center, in accordance with an embodiment of the present invention.

FIG. 2 is a schematic diagram 200 illustrating an exemplary system for affinitizing related dataset extents across a data center, in accordance with an embodiment of the present invention. In particular, FIG. 2 comprises source library 210, partitioning component 220, assignment component 230, breaking component 240, distribution component 250, and data center 260. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Source library 210 provides datasets to a data stream. As the datasets are retrieved from source library 210, partitioning component 220 identifies relationships between the datasets. In particular, partitioning component 220 identifies datasets that are processed together when responding to a query. Alternatively, partitioning component 220 identifies datasets associated with each other based on efficient processing mechanisms. Accordingly, partitioning component 220 begins to partition the data stream as the data stream is being compiled. As such, related datasets are grouped together within partitions formed by partitioning component 220.

Once the data stream has been partitioned, assignment component 230 assigns an affinity identifier to one or more partitions of the data stream. Alternatively, affinity identifiers are assigned to related datasets based on their partition. An affinity identifier may be an Affinity-GUID as discussed above. Further, the affinity identifier(s) may be stored within the data stream. In particular, the affinity identifier(s) may be stored as metadata within the data stream. A data stream with metadata stored within it is described as a structured stream.

Once the data stream has been partitioned and affinity identifiers have been assigned to the partitions of the data stream, the data stream is broken up into extents using breaking component 240. In particular, datasets within the data stream are transparently broken into extents. As datasets within each partition are broken up into extents, each of the extents retains the affinity identifier associated with the partition of its originating dataset. The affinity identifier may then be referenced by distribution component 250 to preferentially store extents sharing affinity identifiers in close proximity to one another within data center 260.

Data center 260 comprises a plurality of layers of storage. Each storage layer within data center 260 comprises sets of computerized devices that are described as PODs, with each POD comprises 20-40 computing devices. Within data centers, proximity of data affects the speed at which that data may be accessed. For instance, it is fastest to process data using components stored on a common computer. It is nearly as fast to process data using components stored on computers within a common POD. Additionally, data traffic is generally more congested to process data using retrieved components from across PODs within a storage layer. And data traffic is generally most congested when retrieving components from across storage layers when processing data. As such, it is beneficial to preferentially store affinitized extents within a close geographic proximity within the data center.

Figure 3:
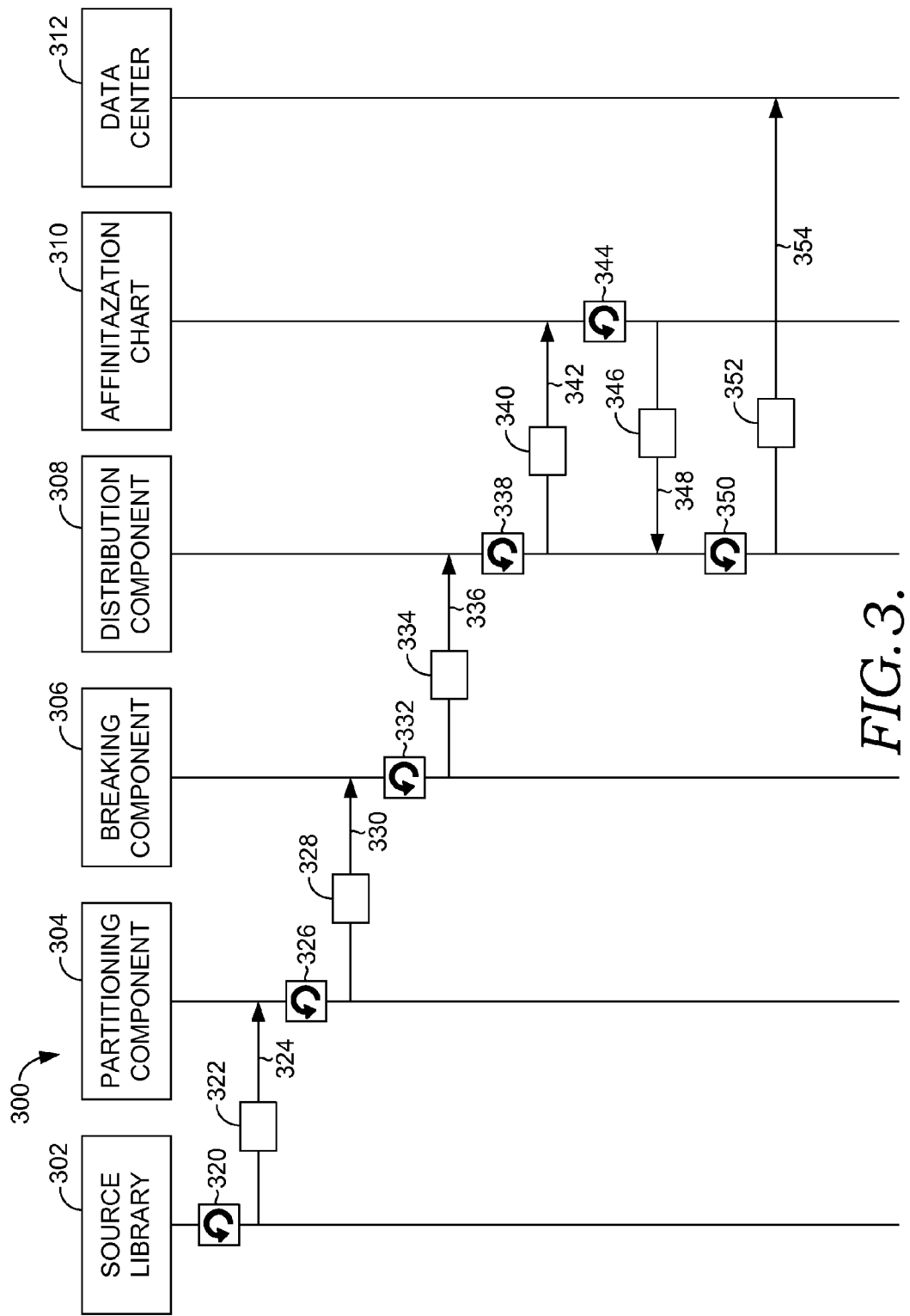
FIG. 3 is a flow diagram that illustrates distributing affinitized related dataset extents across a data center, in accordance with an embodiment of the present invention.

FIG. 3 is a flow diagram 300 illustrating an exemplary distribution of affinitizing related dataset extents across a data center, in accordance with an embodiment of the present invention. At step 320, data stream 322 is generated. In particular, data stream 322 comprises datasets retrieved from source library 302. Data stream 322 is sent 324 to partitioning component 304. Partitioning component 304 is able to identify relationships between datasets. For example, partitioning component 304 is able to identify datasets that are generally processed together. At step 326, data stream 322 is partitioned based on efficient query processing. In particular, datasets that are processed together are grouped together within partitions formed by partitioning component 304. Additionally, the datasets are assigned an affinity identifier based on the formed partitions. The assigned affinity identifiers are stored as metadata within data stream 328, which is a structural stream.

At step 330, the data stream is sent to breaking component 306. At breaking component 306, datasets within data stream 328 are transparently broken 332 into a plurality of extents 334. Each extent of the plurality of extents may retain the affinity identifier of their parent dataset. Alternatively, each extent of the plurality of extents may be assigned an affinity identifier at the point the datasets are broken at breaking component 306. The extents may be assigned an affinity identifier based on their parent dataset, as discussed above, or may be assigned an affinity identifier based on the partition associated with the extents. Extents of the plurality of extents 334 are then sent 336 to distribution component 308. At distribution component 308, affinity identifiers associated with the plurality of extents are recognized.

Once an affinity identifier is recognized, a request 340 is sent 342 from distribution component 308 to affinitization chart 310 to determine 344 whether an extent associated with the affinity identifier is already stored within data center 312. After determining 344 whether an extent associated with the affinity identifier is stored at data center 312, affinitization chart 310 generates 344 a determination 346 and sends 348 the determination 346 to distribution component 308. At step 350, distribution component 308 generates a placement for the extent 352 based on the determination 346. Accordingly, the extent 352 is sent 354 to be placed in data center 312 in accordance with the placement for the extent 352. For example, if there is not yet an extent associated with the affinity identifier stored at data center 312, distribution component 308 will randomly distribute the extent across data center 312. However, if there is an extent having the affinity identifier already stored at data center 312, distribution component 308 will generate a placement of the extent to be preferentially stored within close proximity of the extent having the affinity identifier already stored at data center 312.

A first extent may be placed within close proximity of a second extent that is already stored in data center 312 when the first extent is placed as close to the second extent as possible. For instance, it may be equally weighted in distribution algorithms to place the first extent at a first location within the same POD as the second extent as it is to place the first extent at a second location within a different layer than the second extent. In accordance with embodiments of the present invention, however, the first extent would preferentially be placed in the first location. This is due to the increased efficiency that would be derived from having the first extent and the second extent within close proximity of one another.

However, if it would be more beneficial for a distribution algorithm to place the first extent at the second location rather than the first location, then the two locations are not equally weighted and the first extent would be preferably placed in the second location. Alternatively, the distribution algorithms themselves may be amended to provide a threshold amount of difference between the first location and the second location such that the first extent may be preferentially placed at the first location so long as the second location is not weighted a threshold amount above the first location. Accordingly, in embodiments, the first extent may be placed at the first location even if the second location is weighted slightly higher than the first location, so long as the second location does not meet or exceed the threshold amount of weighting about the first location. The threshold amount of weighting between the first location and the second location may be based on the efficiency gained from placing the first extent at the first location rather than the second location.

Figure 4:
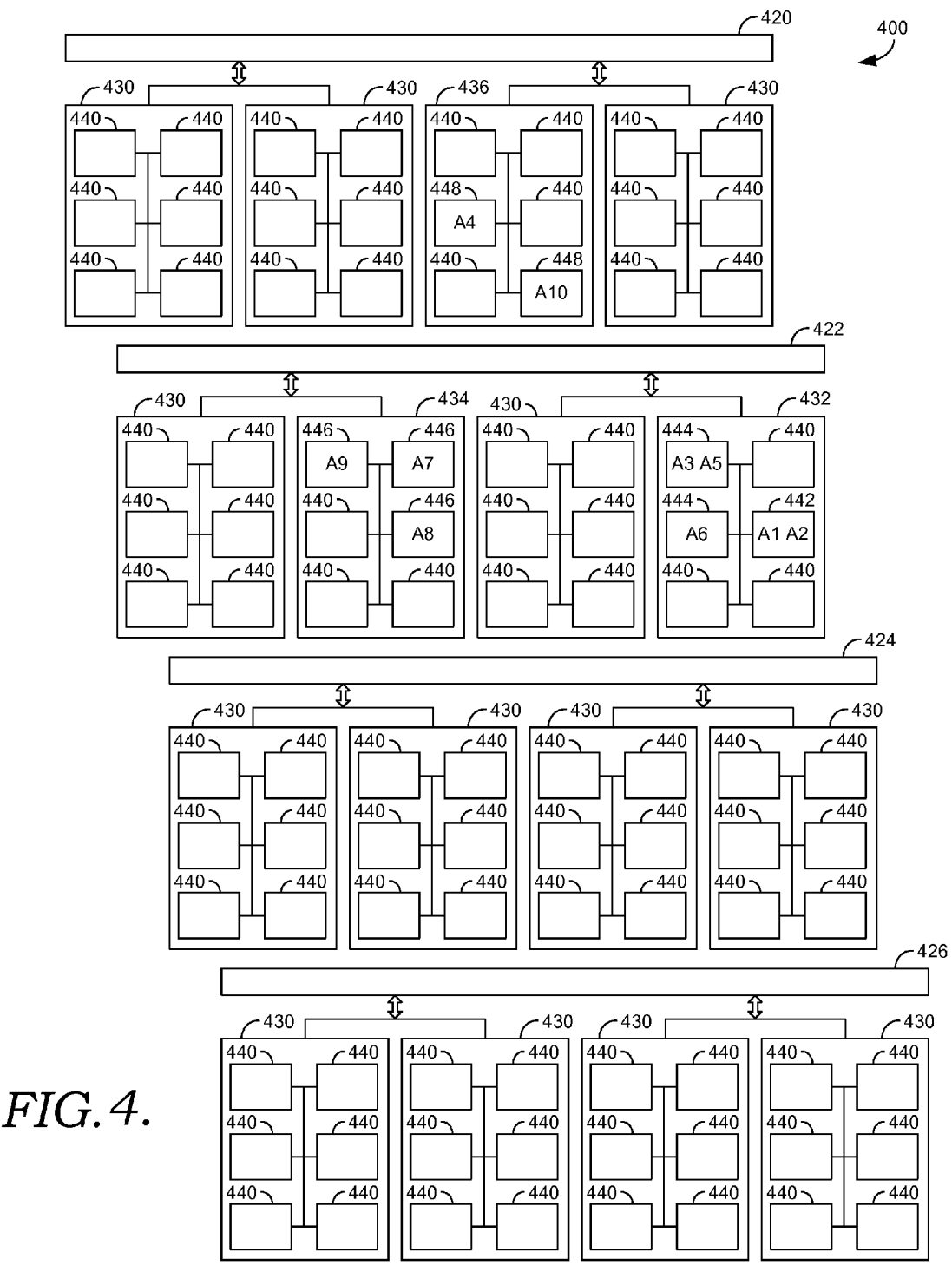
FIG. 4 is a schematic diagram illustrating an exemplary distribution of related dataset extents across a data center, in accordance with an embodiment of the present invention.

FIG. 4 is a schematic diagram illustrating an exemplary distribution 400 of related dataset extents across a data center, in accordance with an embodiment of the present invention. In particular, FIG. 4 illustrates a distribution 400 of related data extents within an affinity group across a data center. The distribution 400 of FIG. 4 illustrates data center 410 comprising four layers 420-426. Each layer 420-426 comprises PODs 430-436 of computers 440-448. Although PODs generally comprises 20-40 computers, as discussed above, each POD 430-436 within FIG. 4 comprises 6 computers to simplify discussion of the distribution 400 of dataset extents across data center 410.

As discussed above, data extents within an affinity group share a common affinity identifier. Accordingly, FIG. 4 illustrates a cluster of data extents within an affinity group. In particular, the affinity group comprises extents "A1," "A2," "A3," "A4," "A5," "A6," "A7," "A8," "A9," and "A10." Data extents within an affinity group are preferentially stored within close proximity to one another in order to increase efficiency of processing a query using the data extents within the affinity group. Accordingly, extents A1 and A2 are stored on a common computer 442 within POD 432 on layer 422. While storing extents on a common computer maximizes the geographic proximity of extents, distribution algorithms for storing data across a data center also work to minimize data skew. In particular, distribution algorithms work to equalize workload across computers within the data center.

In order to do this, distribution algorithms work to maximize the distribution of data across the data center. Accordingly, while it is preferred for affinitized data extents to be stored within close proximity, the proximity of storing affinitized data extents is limited by the availability of storage space available when adjusted to prevent data skew. For example, if layer 422 has too much data stored thereon at the time that an extent, such as A4, is to be placed within data center 412, then the extent A4 will be stored on a different layer.

As such, affinitized data extents may only be able to be preferentially stored on the closest available computing device. This distinction serves to explain how affinitized data extents may be stored on other computers, in other PODs, or even on another layer. As seen in FIG. 4, extents A3, A5, and A6 are stored on different computers 444 within POD 432. Since extents A3, A5 and A6 are within the same POD 432 as extents A1 and A2, the data traffic between the computers 442 and 444 will generally be low. Further, extents A7-A9 are stored within different computers 446 within neighboring POD 434 of layer 420. As such, the data traffic between A5, A7, and A8 will be generally more congested between A1, A2, and A9 than the traffic between A1, A2, A3, A6, and A9.

Additionally, extents A4 and A10 are stored on computer 448 on layer 420, which is separated from the other extents of the affinity group stored on layer 422. As such, traffic will generally be heaviest between A4 or A10 and the other extents of the affinity group. As discussed above, extents A4 and A10 were placed on a different layer due to the preferred layer, 420, being unavailable. As such, even extents within an affinity group may be placed in relatively far proximity when compared with other extents within the affinity group. However, each extent in the affinity group has the preference of being placed in close proximity.

Figure 5:
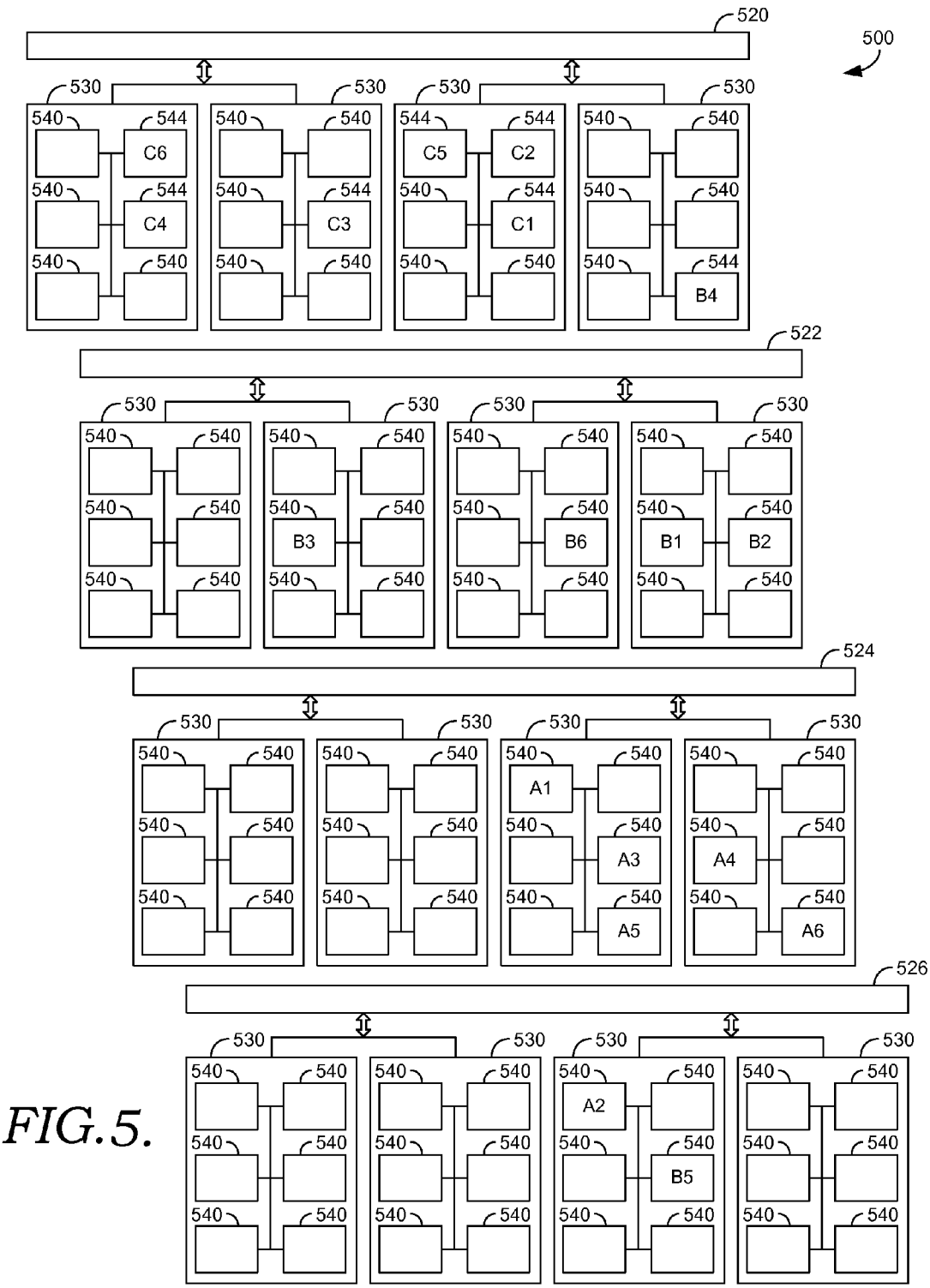
FIG. 5 is another schematic diagram illustrating an exemplary distribution of related dataset extents across a data center, in accordance with an embodiment of the present invention.

FIG. 5 is another schematic diagram illustrating an exemplary distribution of related dataset extents across a data center, in accordance with an embodiment of the present invention. In particular, FIG. 5 illustrates a distribution 500 of related data extents within three replicated affinity groups. The distribution 500 of FIG. 5 illustrates a data center 510 comprising four layers 520-526. Each layer 520-526 comprises PODs 530 of computers 540.

As discussed above, data extents within an affinity group share a common affinity identifier. Further, data extents within an affinity group are generally replicated and stored within data center 510 in order to avoid data loss. In FIG. 5, for example, three replicas of data extents within an affinity group are stored within data center 510. While data extents within an affinity group are preferentially stored together, as discussed above, replicated data extents are preferentially stored away from additional copies of data extents within replicated affinity groups.

Accordingly, FIG. 5 illustrates three basic clusters of affinity groups associated with data extents. In particular, a first affinity group comprises extents "A1," "A2," "A3," "A4," "A5," and "A6." Similarly, a second affinity group comprises extents "B1," "B2," "B3," "B4," "B5," and "B6." Further, a third affinity group comprises extents "C1," "C2," "C3," "C4," "C5," and "C6." In embodiments, there is a preference to store the three affinity groups separately from each other so as to minimize data skew. Accordingly, there may be a preference to store each affinity group on a separate data layer. As seen in FIG. 5, there is a preference to store extents A1-A6 on layer 524; to store extents B1-B6 on layer 522; and to store extents C1-C6 on layer 520.

However, as with the example given above, having a preference to store data extents within close proximity is not always commensurate with data space that is available for storage. For example, if a layer is storing a disproportionate amount of data relative to the rest of the data center, then a distributing component may not store any data on the layer when an extent is being stored. Accordingly, extents A2 and B5 are shown to be stored on layer 526, apart from the rest of either of their affinity groups at layer 524 and 522, respectively.

While FIG. 5 illustrates a distribution 500 where the three affinity groups are preferably stored on separate layers, alternative embodiments may provide that at least two of the replicated affinity groups are preferably stored in close proximity to each other. It may be advantageous to store two of the three replicated affinity groups together so as to increase the retrieval efficiency of datasets within the two affinity groups. Accordingly, when a query is received from a user, a job manager may preferentially retrieve datasets from the location of the two replicated affinity groups stored within the data center rather than retrieve datasets from the location of the third replicated affinity group in order to increase the efficiency of processing the query.

Figure 6:
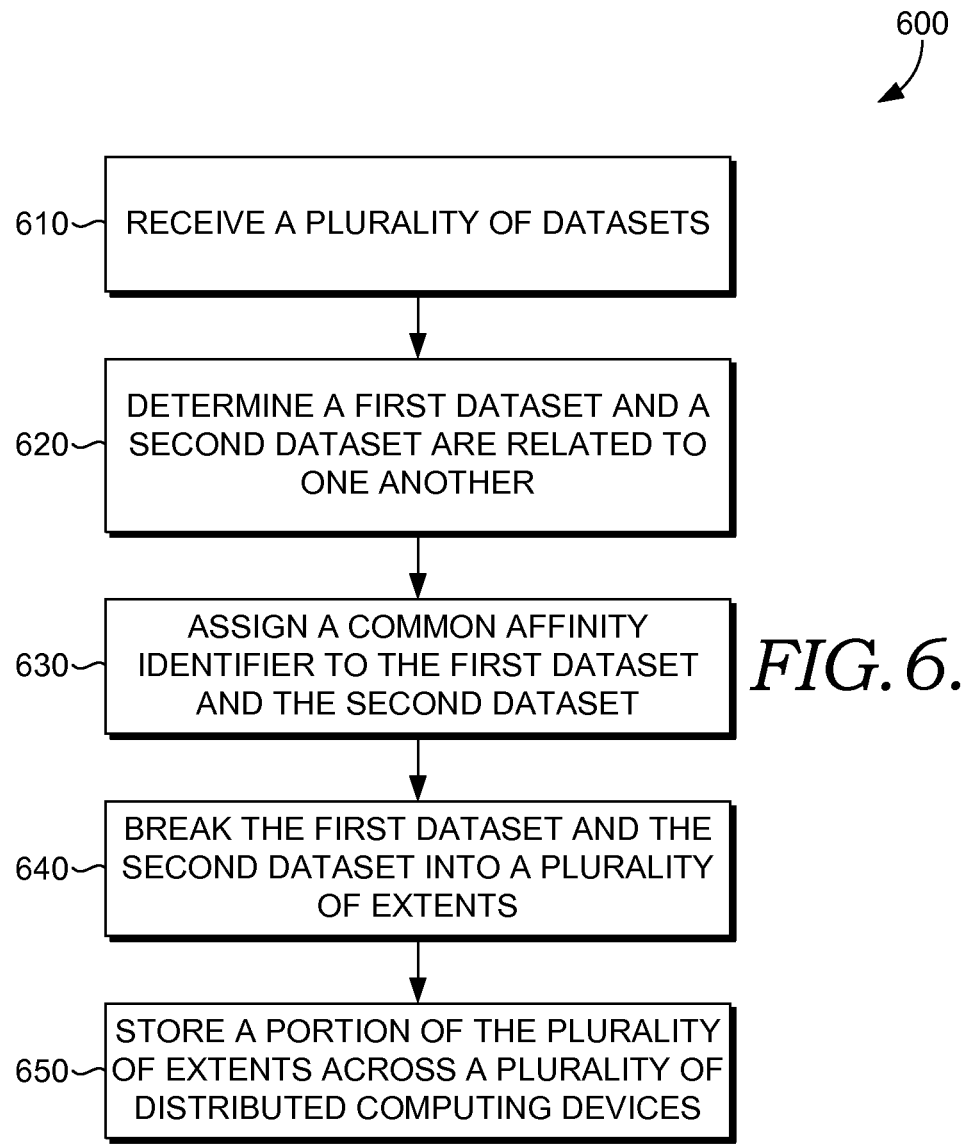
FIG. 6 is a flow diagram illustrating a method of affinitizing datasets based on efficient query processing, in accordance with an embodiment of the present invention.

Turning now to FIG. 6, a flow diagram 600 is shown illustrating a method of affinitizing datasets based on efficient query processing, in accordance with an embodiment of the present invention. At step 610, a plurality of datasets is received. The plurality of datasets may be received from a store library. Further, the plurality of datasets may be within a data stream. At step 620, a determination is made that a first dataset and a second dataset of the plurality of datasets are related to one another. In particular, relatedness may be based on the first dataset and the second dataset being executed together in processing mechanisms. For instance, the first dataset and the second dataset may be commonly executed together in response to a query request.

At step 630, a common affinity identifier is assigned to the first dataset and the second dataset based on determining the first dataset and the second dataset are related to one another. The common affinity identifier may be assigned to the first dataset and the second dataset at runtime of the data stream. Alternatively, the common affinity identifier may be assigned to the first dataset and the second dataset at compilation of the data stream. Further, the common affinity identifier may be based on partitioning the data stream. Alternatively, the common affinity identifier may be based on referencing the data stream to a second data stream. In particular, the data stream may be partitioned based on the partitioning of the second data stream.

At step 640, the first dataset and the second dataset are broken into a plurality of extents. In particular, each of the first dataset and the second dataset are transparently broken in a plurality of extents. Additionally, each extent of the plurality of extents has the common affinity identifier based on each extent deriving from the first dataset and the second dataset. Further, at step 650, a portion of the plurality of extents is stored across a plurality of distributed computing devices. Extents having the common affinity identifier are preferentially stored on computing devices that are in close proximity to one another.

Figure 7:
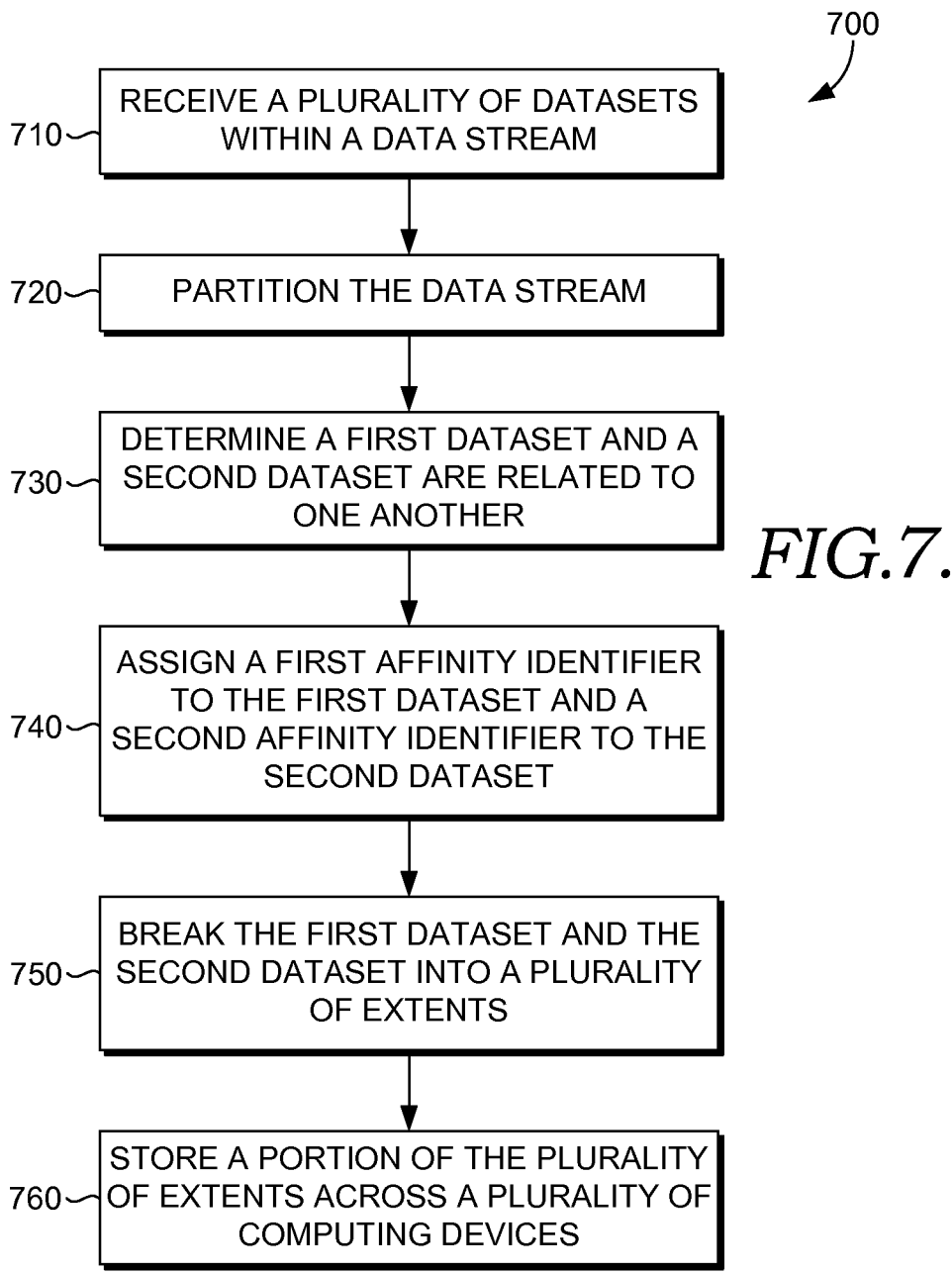
FIG. 7 is a flow diagram illustrating a method of affinitizing datasets based on efficient query processing, in accordance with an embodiment of the present invention.

FIG. 7 is a flow diagram 700 illustrating a method of affinitizing datasets based on efficient query processing, in accordance with an embodiment of the present invention. At step 710, a plurality of datasets within a data stream is received. In particular, the plurality of datasets may be within a structural stream that is able to store metadata within the data stream. At step 720, the data stream is partitioned. For example, the partitioning may comprise hash partitioning or range partitioning. Further, the partitioning may be based on query processing efficiency. For instance, the data stream may be partitioned based on the first dataset and the second dataset being processed within a threshold amount of time in response to a query.

Additionally, at step 730, a determination is made that a first dataset and a second dataset of the plurality of datasets are related to one another based on partitioning the data stream. For example, the first dataset and the second dataset may be related based on the first dataset and the second dataset being within the same partition of the data stream. Alternatively, the first dataset and the second dataset may be related based on the first dataset and the second dataset being within related partitions of the data stream. At step 740, a first affinity identifier is assigned to the first dataset and a second affinity identifier is assigned to the second dataset. The affinity identifiers may be assigned based on determining the first dataset and the second dataset are related to one another. Additionally, the affinity identifiers may be assigned to the first dataset and the second dataset at runtime of the data stream. Alternatively, the affinity identifiers may be assigned to the first dataset and the second dataset at compilation of the data stream.

Further, the affinity identifiers may be based on partitioning the data stream. Alternatively, the affinity identifiers may be based on referencing the data stream to a second data stream. In particular, the data stream may be partitioned based on the partitioning of the second data stream. Additionally, the affinity identifiers associated with the first dataset and the second dataset may be stored as metadata within the data stream in embodiments where the data stream is a structural stream.

At step 750, the first dataset and the second dataset are broken into a plurality of extents. Each extent of the plurality of extents may have the affinity identifier of the dataset from which it originated. In particular, each extent may retain the affinity identifier of its parent dataset. A parent dataset may comprise the dataset from with its child extent originates. Additionally, at step 760, a portion of the plurality of extents is stored in each of a plurality of distributed computing devices. Extents that share an affinity identifier are preferentially stored on computing devices that are in close proximity to one another.

However, as discussed above, storage of extents may be limited based on availability of data storage within a data center in accordance with the data center's distribution algorithms. In embodiments, the distribution algorithms may also be weighted to allow increased potential for data skew when assigning extents having affinity identifiers such that once the extents having affinity identifiers are assigned, the distribution would be counter-weighted to accommodate for a resultant temporarily uneven distribution attributable to placing an extent near its affinity group.

Figure 8:
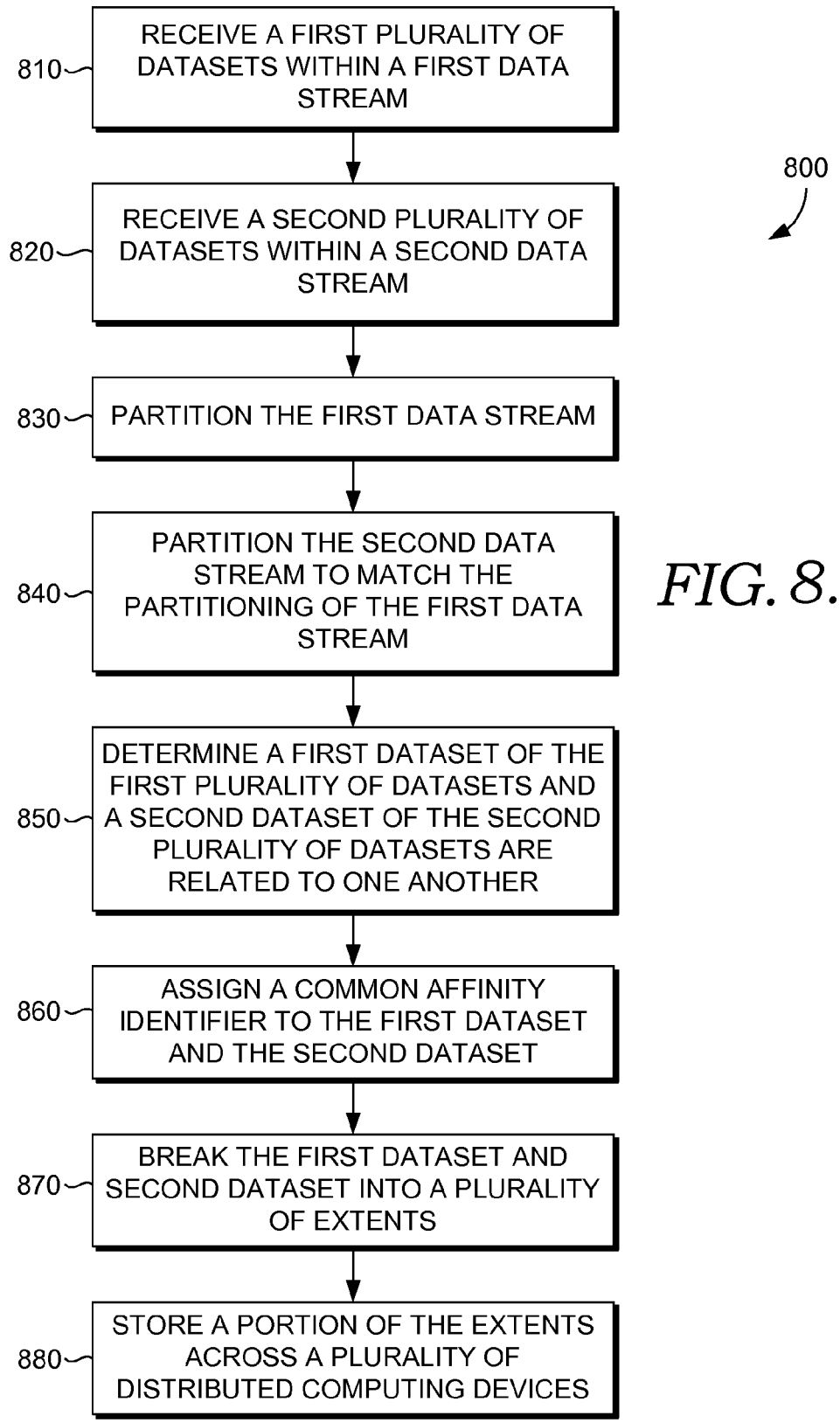
FIG. 8 is a flow diagram illustrating a method of affinitizing datasets based on efficient query processing, in accordance with an embodiment of the present invention.

FIG. 8 is a flow diagram 800 illustrating a method of affinitizing datasets based on efficient query processing, in accordance with an embodiment of the present invention. At step 810, a first plurality of datasets within a first data stream is received. The data stream may be a structural stream. Further, at step 820, a second plurality of datasets within a second data stream is received. Similar to the first data stream, the second data stream may be a structural stream. At step 830, the first data stream is partitioned. For example, the partitioning may comprise hash partitioning or range partitioning. The partitioning of the first data stream may be based on efficient query processing. Further, at step 840, the second data stream is partitioned to match the partitioning of the first data stream.

Additionally, at step 850, a determination is made that a first dataset of the first plurality of datasets and a second dataset of the second plurality of datasets are related to one another. In particular, the first dataset and the second dataset may be related to one another based on the first dataset and the second datasets being within correlated partitions of the first data stream and the second data stream, respectively. At step 860, a common affinity identifier may be assigned to the first dataset and the second dataset. In particular, the common affinity identifier may be assigned to the first dataset and the second dataset at runtime of the first data stream and second data stream, respectively. Alternatively, the common affinity identifier may be assigned to the first dataset and the second dataset at compilation of the first data stream and the second data stream, respectively.

Further, the common affinity identifier may be based on partitioning of the first data stream. Alternatively, the common affinity identifier may be based on referencing the second data stream to the first data stream. Additionally, the common affinity identifier associated with the first dataset may be stored as metadata within the first data stream in embodiments where the first data stream is a structural stream. Similarly, the common affinity identifier associated with the second dataset may be stored as metadata within the second data stream in embodiments where the second data stream is a structural stream.

At step 870, the first dataset and second dataset are broken into a plurality of extents. Each extent of the plurality of extents has the common affinity identifier of the dataset from which it originated. Further, at step 860, a portion of the plurality of extents is stored across a plurality of distributed computing devices at a data center. Extents having the common affinity identifier are preferentially stored on computing devices that are in close proximity to one another.

In particular, preferentially storing extents having the common affinity identifier on computing devices that are in close proximity to one another may comprise storing extents having the common affinity identifier as close to each other as possible given availability within the data center at the time of storing the extents having the same identifier. Alternatively, preferentially storing extents having the common affinity identifier on computing devices that are in close proximity to one another may comprise identifying a location of a first extent having the common affinity identifier and placing a second extent having the common affinity identifier as close to the location of the first extent as possible given availability within the data center at the time of storing the second extent Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media having computer-executable instructions embodied thereon that, when executed, perform a method of affinitizing datasets based on efficient query processing, the method comprising:
receiving a plurality of datasets within a data stream;
determining a first dataset and a second dataset of the plurality of datasets are related to one another;
assigning a common affinity identifier to the first dataset and the second dataset based on determining the first dataset and the second dataset are related to one another;
breaking the first dataset and the second dataset into a plurality of extents;
assigning the common affinity identifier to each extent of the plurality of extents; and
storing a portion of the plurality of extents across a plurality of distributed computing devices, wherein extents having the common affinity identifier are stored on computing devices that are as close to each other as possible given availability within the data center at the time of storing the extents having the common affinity identifier.

2. The one or more computer-storage media of claim 1, wherein the affinity identifier assigned to the first dataset and the second dataset is assigned at runtime of the data stream.

3. The one or more computer-storage media of claim 1, wherein the affinity identifier assigned to the first dataset and the second dataset is assigned at compilation of the data stream.

4. The one or more computer-storage media of claim 1, wherein the affinity identifier assigned to the first dataset and the second dataset is assigned based on reference to a second data stream.

5. The one or more computer-storage media of claim 4, wherein the affinity identifier assigned to the first dataset and the second dataset is assigned based on partitioning of the second data stream.

6. One or more computer-storage media having computer-executable instructions embodied thereon that, when executed, perform a method of affinitizing datasets based on efficient query processing, the method comprising:
  receiving a plurality of datasets within a data stream;
  partitioning the data stream;
  determining a first dataset and a second dataset of the plurality of datasets are related to one another based on partitioning the data stream;
  assigning a first affinity identifier to the first dataset and a second affinity identifier to the second dataset based on determining the first dataset and the second dataset are related to one another;
  breaking the first dataset and the second dataset into a plurality of extents, each extent of the plurality of extents having an affinity identifier of the dataset from which it originated; and
  storing a portion of the plurality of extents across a plurality of distributed computing devices, wherein extents that share an affinity identifier are stored on computing devices that are in close proximity to one another by identifying a location of a first extent having the common affinity identifier and placing a second extent having the common affinity identifier as close to the location of the first extent as possible given availability within the data center at the time of storing the second extent.

7. The one or more computer-storage media of claim 6, wherein the data stream is a structural stream.

8. The one or more computer-storage media of claim 6, wherein partitioning the data stream is based on query processing efficiency.

9. The one or more computer-storage media of claim 8, wherein the first dataset and the second dataset are related to each other based on the first dataset and the second dataset being processed within a threshold amount of time in response to a query.

10. The one or more computer-storage media of claim 6, wherein partitioning the data stream comprises hash partitioning.

11. The one or more computer-storage media of claim 6, wherein partitioning the data stream comprises range partitioning.

12. The one or more computer-storage media of claim 6, wherein the first affinity identifier matches the second affinity identifier.

13. The one or more computer-storage media of claim 12, wherein each extent of the plurality of extents share a common affinity identifier based on a common affinity identifier of a parent dataset of each extent.

14. One or more computer-storage media having computer-executable instructions embodied thereon that, when executed, perform a method of affinitizing datasets based on efficient query processing, the method comprising:
  receiving a first plurality of datasets within a first data stream;
  receiving a second plurality of datasets within a second data stream;
  partitioning the first data stream;
  partitioning the second data stream to match the partitioning of the first data stream;
  determining a first dataset of the first plurality of datasets and a second dataset of the second plurality of datasets are related to one another based on the partitioning of the first data stream matching the partitioning of the second data stream;
  assigning a common affinity identifier to the first dataset and the second dataset based on determining the first dataset and the second dataset are related to one another;
  breaking the first dataset and the second dataset into a plurality of extents, each extent of the plurality of extents having the common affinity identifier of the dataset from which it originated; and
  storing a portion of the plurality of extents across a plurality of distributed computing devices at a data center, wherein extents having the common affinity identifier are stored on computing devices located within the data center as close to each other as possible given availability within the data center at the time of storing the extents having the common affinity identifier.

15. The one or more computer-storage media of claim 14, wherein partitioning the data stream is based on efficient query processing.

16. The one or more computer-storage media of claim 14, wherein the data stream is a structural stream having metadata stored within the data stream.

17. The one or more computer-storage media of claim 16, wherein the common affinity identifiers are stored within the data stream.

* * * * *